United States Patent
Garcia Albert et al.

(10) Patent No.: US 12,474,689 B2
(45) Date of Patent: Nov. 18, 2025

(54) PREDICTING SYSTEM IN ADDITIVE MANUFACTURING PROCESS BY MACHINE LEARNING ALGORITHMS

(71) Applicant: Atos Spain Sociedad Anonima, Madrid (ES)

(72) Inventors: Enrique Garcia Albert, Madrid (ES); Daniel Campillo Garrote, Móstoles (ES)

(73) Assignee: BULL SAS, Les Clayes sous Bois (FR)

( * ) Notice: Subject to any disclaimer, the term of this patent is extended or adjusted under 35 U.S.C. 154(b) by 1178 days.

(21) Appl. No.: 17/362,064

(22) Filed: Jun. 29, 2021

(65) Prior Publication Data

US 2021/0405613 A1    Dec. 30, 2021

(30) Foreign Application Priority Data

Jun. 30, 2020 (EP) .................................... 20382581

(51) Int. Cl.
*G05B 19/4099* (2006.01)
*G06N 3/04* (2023.01)
(Continued)

(52) U.S. Cl.
CPC .......... *G05B 19/4099* (2013.01); *G06N 3/04* (2013.01); *G06N 3/08* (2013.01); *G06N 5/04* (2013.01);
(Continued)

(58) Field of Classification Search
CPC ...... G05B 19/4099; G05B 2219/49023; G06N 20/00; G06N 3/04; G06N 3/08; G06N 5/04

See application file for complete search history.

(56) References Cited

U.S. PATENT DOCUMENTS 8,280,887 B1 * 10/2012 Stork .................... G06F 18/231
707/722
11,002,649 B1 * 5/2021 Boyce ...................... G01N 3/04
(Continued)

FOREIGN PATENT DOCUMENTS

| EP | 3459715 A1 | 3/2019 |
| EP | 3581380 A2 | 12/2019 |
| EP | 3671387 A1 | 6/2020 |

OTHER PUBLICATIONS

Bin Zhang, Shunyu Liu, Yung C. Shin, In-Process monitoring of porosity during laser additive manufacturing process, Additive Manufacturing, vol. 28, 2019, pp. 497-505, ISSN 2214-8604, https://doi.org/10.1016/j.addma.2019.05.030. (Year: 2019).*

(Continued)

*Primary Examiner* — Jeremy L Stanley
(74) *Attorney, Agent, or Firm* — Meagher Emanuel Laks Goldberg & Liao, LLP

(57) ABSTRACT

It is disclosed a method and a predicting system for automatic prediction of porosity appearance generated during Laser Powder Bed Fusion (L-PBF), performed by an additive manufacturing system from at least one material. The method comprises steps for training a neural network comprising: generating labels of pore in every pixel using a porosity simulator; pre-training, comprising a first sub-step and a second sub-step, the second sub-step comprises using the data set created from the first sub-step to generate a pre-trained ML model; and training, comprising a first sub-step and a second sub-step, the second sub-step comprises using the data set created from the first sub-step to train the pre-trained ML model to generate a trained ML model.

10 Claims, 5 Drawing Sheets

(51) Int. Cl.
  *G06N 3/08* (2023.01)
  *G06N 5/04* (2023.01)
  *G06N 20/00* (2019.01)

(52) U.S. Cl.
  CPC ... *G06N 20/00* (2019.01); *G05B 2219/49023* (2013.01)

(56) References Cited

U.S. PATENT DOCUMENTS

| | | | | |
|---|---|---|---|---|
| 11,585,765 | B1* | 2/2023 | Kim | G06T 7/0004 |
| 11,701,832 | B2* | 7/2023 | Hosseini Rankouhi | B22F 10/36 |
| | | | | 700/98 |
| 12,070,907 | B2* | 8/2024 | Lappas | B22F 10/80 |
| 2002/0148961 | A1* | 10/2002 | Nakasuji | G01N 23/2251 |
| | | | | 250/311 |
| 2005/0271297 | A1* | 12/2005 | Zbilut | G06V 10/751 |
| | | | | 382/286 |
| 2006/0066836 | A1* | 3/2006 | Bridges | G01B 11/024 |
| | | | | 356/29 |
| 2010/0272340 | A1* | 10/2010 | Bar-Aviv | G06T 5/20 |
| | | | | 382/262 |
| 2011/0285843 | A1* | 11/2011 | Saeki | G06T 7/001 |
| | | | | 348/222.1 |
| 2011/0286659 | A1* | 11/2011 | Saeki | G06T 7/001 |
| | | | | 382/152 |
| 2013/0156305 | A1* | 6/2013 | Prasad | G06T 7/162 |
| | | | | 382/164 |
| 2013/0340521 | A1* | 12/2013 | Clark | F01D 5/26 |
| | | | | 73/462 |
| 2015/0213374 | A1* | 7/2015 | Agarwal | G06F 18/2411 |
| | | | | 706/12 |
| 2016/0034614 | A1* | 2/2016 | Wang | G06F 30/27 |
| | | | | 703/2 |
| 2017/0144378 | A1* | 5/2017 | Giera | G06N 20/20 |
| 2018/0068463 | A1* | 3/2018 | Risser | G06T 7/45 |
| 2018/0095450 | A1* | 4/2018 | Lappas | B33Y 10/00 |
| 2018/0150675 | A1* | 5/2018 | Kamiyama | A61B 5/00 |
| 2018/0341248 | A1* | 11/2018 | Mehr | G06N 20/10 |
| 2019/0043242 | A1* | 2/2019 | Risser | G06T 15/04 |
| 2019/0172074 | A1* | 6/2019 | Siwo | G06Q 30/0185 |
| 2019/0384274 | A1* | 12/2019 | Bharadwaj | G05B 19/4099 |
| 2019/0385020 | A1* | 12/2019 | Umeda | G06T 7/00 |
| 2020/0020108 | A1* | 1/2020 | Pao | G06T 7/90 |
| 2020/0147893 | A1* | 5/2020 | Yang | B22F 10/28 |
| 2020/0166909 | A1* | 5/2020 | Noone | G06N 20/00 |
| 2020/0320753 | A1* | 10/2020 | Feng | A61B 6/037 |
| 2020/0333295 | A1* | 10/2020 | Schiffres | G01N 29/041 |
| 2021/0318673 | A1* | 10/2021 | Kitchen | G05B 13/048 |
| 2021/0357698 | A1* | 11/2021 | Murasaki | G06T 7/00 |
| 2021/0362242 | A1* | 11/2021 | Storck | B22F 10/85 |
| 2021/0370993 | A1* | 12/2021 | Qian | G06T 7/75 |
| 2022/0016846 | A1* | 1/2022 | Luan | B22F 12/90 |
| 2022/0143704 | A1* | 5/2022 | Tran | B23K 26/082 |
| 2022/0146990 | A1* | 5/2022 | Lammens | G05B 23/0283 |
| 2022/0244194 | A1* | 8/2022 | Perron | G01N 21/8851 |
| 2022/0388070 | A1* | 12/2022 | Luan | B33Y 50/00 |
| 2023/0203925 | A1* | 6/2023 | Duan | E21B 49/00 |
| | | | | 703/10 |
| 2023/0258574 | A1* | 8/2023 | Bonhage | G06T 7/0004 |
| | | | | 356/237.1 |
| 2023/0260103 | A1* | 8/2023 | Jahangir | G06T 7/001 |
| | | | | 382/152 |

OTHER PUBLICATIONS

C. Gobert, A. Kudzal, J. Sietins, C. Mock, J. Sun, B. McWilliams, Porosity segmentation in X-ray computed tomography scans of metal additively manufactured specimens with machine learning, Additive Manufacturing, vol. 36, 2020, 101460, ISSN 2214-8604, https://doi.org/10.*

European Search Report for corresponding EP Application No. 20382581, dated.

Zhang et al., "In-Process monitoring of porosity during laser additive manufacturing process", Additive Manufacturing, vol. 28, pp. 497-505, Aug. 1, 2019.

Yang, et al., "Dynamic Metamodeling for Predictive Analytics in Advanced Manufacturing" Smart and Sustainable Manufacturing Systems, vol. 2, No. 1, 2018, pp. 18-39.

* cited by examiner

PREDICTING SYSTEM IN ADDITIVE MANUFACTURING PROCESS BY MACHINE LEARNING ALGORITHMS

FIELD OF THE INVENTION

The present invention relates to the field of Additive Manufacturing (AM) and in particular to the field of Laser Powder Bed Fusion (L-PBF). In particular, it concerns automatic prediction of porosity appearance generated during L-PBF and in turn predictability of the mechanical properties being impacted by the porosity appearance.

BACKGROUND OF THE INVENTION

Additive Manufacturing (AM) techniques are of a growing interest to industry due to its capability of manufacturing complex geometries. The AM technology of Laser Powder Bed Fusion (L-PBF) encompassing Selective Laser Melting (SLM) in particular, is experiencing a rapid development in an increasing market of certain application fields such as the aerospace, where the demand for the fundamental understanding and predictability of mechanical properties is becoming higher, namely for the requirements of the certification and qualification process with a competitive cost, as compared to that of the conventional manufacturing process.

AM processes in general, and L-PBF in particular, are very sensitive to many technical parameters. Variations in process parameters and material attributes can influence not only the microstructural features of the resulting product but may also lead to the generation of defects, or anomaly, which is understood as a structural deviation from a desired uniform, isotropic, fully dense solid. Typical defects can be classified into porosity defects, residual stresses, geometrical anomalies, anisotropy and phase stability, microcracks and oxide inclusions. Each kind of these defects influences the resulting production is a different way. For example, certain porosity defects may play a relevant role on the fatigue behavior. Therefore, in order to predict the mechanical properties before the final product is made, there exist a need to be able to predict for example the porosity defects.

However, so far there is not any implementation system in AM printers that could predict the porosity defects, either in advance/beforehand or during the manufacturing process. In other words, the existing AM printer only monitors the manufacturing parameters and uses simple alert systems. The alert/prediction system is rather based on the printer's specifications which do not include variables such as structure, geometry or other characteristics of the raw material used for the printer. So the existing AM cannot avoid any defect in the final product.

Taking into consideration of the enormous difficulties in considering all the parameters that may influence the appearance of pore and the complex interrelationships exited between them, it is a challenge to develop a predictive model which allows to automatically predict the porosity appearance with affordable computational cost to meet (quasi) real-time constraints of the on-the-flow detection.

SUMMARY OF THE INVENTION

According to a first aspect of the present invention, there is provided a method for automatic prediction of porosity appearance generated during Laser Powder Bed Fusion (L-PBF), performed by an additive manufacturing system from at least one material. The method comprises steps for training a neural network comprising: generating labels of pore in every pixel using a porosity simulator; pre-training, comprising a first sub-step and a second sub-step, the second sub-step comprises using the data set created from the first sub-step to generate a pre-trained ML model; and training, comprising a first sub-step and a second sub-step, the second sub-step comprises using the data set created from the first sub-step to train the pre-trained ML model to generate a trained ML model, the first sub-step of each of the pre-training and the training further comprises processing input features and processing of pore label features for each pixel to create the data set to be used by the second sub-step of pre-training and training respectively, the pixels being obtained by reading a kinematic laser file comprising at least an X coordinate and an Y coordinate of each of a plurality of points in a laser path being associated with a time value, the plurality of points being situated on a 2D mesh representing a single layer of the material; and the pore label features being processed in the first sub-step of pre-training is based on the labels of pore generated by the porosity simulator; and the pore label features being processed in the first sub-step of training is based on tomography of manufactured coupons.

In some embodiments, the method further comprises a fine-tuning step following the training step, the fine-tuning comprises repeating iteratively the training step with the training data set and a validation data set, to generate an optimized trained ML model where the validation data set generated by the optimized model meets the conditions for absence of overfitting and underfitting.

In some embodiments, the method further comprises steps for predicting porosity appearance generated during Laser Powder Bed Fusion (L-PBF), performed by an additive manufacturing system from at least one material, comprising: applying the trained ML model on new data continuously provided by said AM system in order to make a prediction of the porosity appearance.

In some embodiments, the steps for predicting porosity appearance further comprises a post-processing step following applying and comprising dividing the at least one into different areas based on different levels of fatigue damage tolerance so that the impact in the fatigue strength of the component is evaluated.

In some embodiments, the input features being processed in the first sub-step is obtained by preprocessing steps comprising: kinematic processing to generate a distance matrix based on kinematic laser data, calculating a distance correlation of pixels comprising covariance matrix based on the distance matrix, and generating Correlation Density Spectrum (CDS) based on the covariance matrix.

In some embodiments, the CDS is calculated for all the pixels of a 2D mesh representing a single layer of the material excluding the contours of the 2D mesh generated by discretization based on the covariance matrix, and said CDS comprises data in the form of Distance Density Histograms (DDH).

In some embodiments, the pore label features being processed in the first sub-step comprises porosity probability values of each pixel, being converted from labels of pore of presence or absence of each pixel (1 or 0) by following a Normal distribution.

In some embodiments, the data set created in the first sub-step to be used in the second sub-step is with respect to a set of feature vectors linked to porosity likelihood label.

In some embodiments, the training step comprises applying transfer learning comprising reusing the pre-trained model, adding at least one layer to the neural network having been pre-trained in pre-training step, and adjusting the weights related to the added at least one layer to train the manufactured coupons.

According to a second aspect of the present invention, there is provided a predicting system for automatic prediction of porosity appearance generated during Laser Powder Bed Fusion (L-PBF), performed by an additive manufacturing system from at least one material, comprising modules being configured for training a neural network: a generating module, being configured to generate labels of pore in every pixel using a porosity simulator; a pre-training module comprising a first sub-module and a second sub-module, the second sub-module being configured to use the data set created from the first sub-module to generate a pre-trained model; and a training module comprising a first sub-module and a second sub-module, the second sub-module being configured to use the data set created from the first sub-module to train the pre-trained model to generate a trained ML model, wherein the first sub-module is configured to process input features and to process pore label features in every pixel to create the data set to be used by the second sub-module; and wherein the pore label features being processed in the first sub-module of the pre-training module is based on the output of the porosity simulator; and the pore label features being processed in the first sub-module of the training module is based on tomography of manufactured coupons.

In some embodiments, the system further comprises a fine-tuning module, being configured to generate an optimized trained model based on the trained model received from the training module.

In some embodiments, the system further comprises modules for making prediction being configured to: apply the trained model on new data continuously provided by said AM system in order to make a prediction of the porosity appearance, and post-process the prediction of the porosity appearance, comprising dividing the at least one material into different areas based on different levels of fatigue damage tolerance so that the impact in the fatigue strength of the component is evaluated.

DETAILED DESCRIPTION OF THE INVENTION

It appears clearly that the technical parameters mentioned here are only examples and shall not be understood as exhaustive. Indeed, all parameters which may have an influence on the manufacturing process should be considered, regardless of whether it relates to the AM system, to the materials 2, to the environmental context, to the pre-processing and post-processing phases etc.

Figure 1:
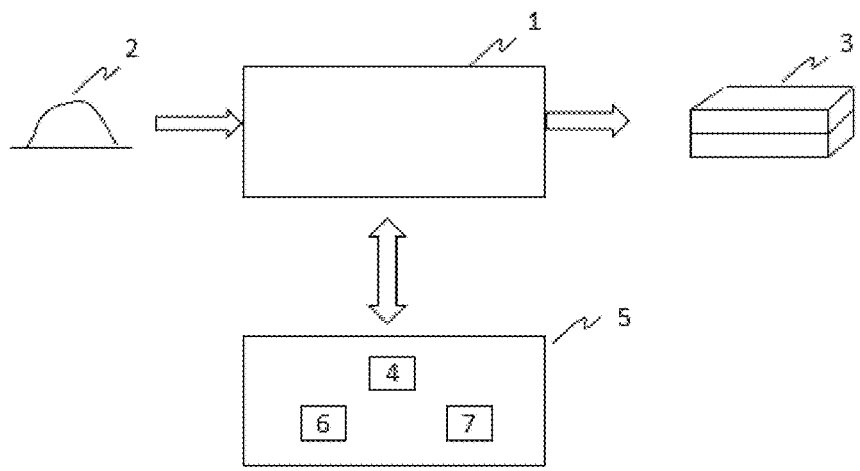
FIG. 1 shows a general architecture according to embodiments of the invention.

FIG. 1 shows a general architecture using trained ML model for automatic porosity prediction according to embodiments of the invention namely with the presence of an AM system 1, material 2, product 3 and a predicting system 5. As depicted in FIG. 1, the AM system 1 may be any additive manufacturing machine known in the art or still to be designed aiming in producing a product 3 from materials 2. In some examples, the AM system 1 may be a printing system. Note that the terms "AM system" and "printing system" are interchangeable in the context of the present invention.

A product should be here understood as any solid object built by an AM machine. Accordingly a product may be a "sub product" of a final product. It can be sold as it, or assembled to other products, parts or components, at a later stage to produce a final product. These aspects are not part of the invention and will thus not be further described.

The predicting system 5 may be any system or apparatus for automatic prediction of porosity appearance comprising means or element for or being configured to predict porosity appearance, or may be a system or an apparatus comprising means or element for or being configured to perform step(s) used for automatic prediction of porosity appearance.

In some examples, the predicting system 5 may comprise a training element 6 and/or a predicting element 7. Although both training element 6 and predicting element 7 are shown for illustrative purpose in predicting system 5, the predicting system 5 is not limited to comprise both. The predicting system 5 may comprise either training element 6 or predicting element 7 or both of them.

In some further examples, the predicting system 5 may comprise an already trained ML model for automatic porosity prediction. In other words, the prediction system 5 herein may be applicable during the prediction stage or process, but is not limited to. The prediction system 5 herein may be applicable during the training stage or process. The training process and the prediction process will be explained in more details below by referring to FIG. 3 and FIG. 6 respectively.

The predicting system 5 is connected to the printing system 1 and receives data from the printing system 1 (as shown in FIG. 1 by arrowed lines). During the training phase, the predicting system 5 may comprise the training element 6. During the prediction phase, the predicting system 5 may comprise the predicting element 7. Although during certain stage (for example, the development stage) of the training phase, the training element 6 may not be interactive with the printing system 1 and may be uncoupled from the latter, the arrowed lines showing two-way communications in between the printing system 1 and the predicting system 5 should be understood as a general expression to encompasses all the examples being consistent to the teaching of the present invention, rather than for purpose of excluding. The training phase and the predicting phase will be explained later with reference to FIG. 7 and FIG. 8 respectively and separately.

In some examples, information such as process parameters, geometry of components to be built, etc. is collected from the printing system 1, then preprocessed and finally stored in a database 4, next to the porosity of the components found in the tomography. In FIG. 1, the database 4 is shown comprised in the predictive system 5, but it is not limited thereto.

In some examples, after being generated by the training process, the trained ML model in the predicting system 5 (not shown in FIG. 1) may be encapsulated or packaged, and may be incorporated to the architecture of the prediction system 1 and be integrated with the other systems of FIG. 1.

In some examples, a final product of the present invention may be configured to carry out a prediction process using the previously trained ML model. This final product may refer to the prediction system 5 which in FIG. 1 is connected to the printing system 1.

There might be other entities or modules being involved in communications between the printing system 1 and the predicting system 5 which are not shown linked with the arrowed lines: for example, data may be fed by a process operator into the database 4 associated with the monitoring system 5, information may come from databooks, specifications of the printing system 1.

The principle of the present invention and the implementations of the predicting system 5 according to some embodiments of the invention will now be described with reference to FIGS. 2-8.

Studies show that pore formations in AM by L-PBF are mainly due to two main mechanisms: lack of fusion of the metal powder and/or an excess of energy accumulation that produces partial metal evaporations. This said, the temperature prediction may be a key factor for the pore prediction.

However, thermal simulations with commercial software requires a high computational cost mainly due to the high number of manufactured coupons needed to achieve acceptable accuracy.

The present invention proposes a solution where this high computational cost for thermal simulations with manufacturing specimens can be saved by using a covariance distance matrix that evaluates the correlations between pairwise pixels belonging to the laser path, which involves less cost than the thermal metric.

According to some embodiments of the present invention, the correlations is measured by the calculations of the distance between pixels with a certain metric. Quantifying these correlations may enable to estimate qualitatively the temperature reach in every point without having to perform complex thermal predictions.

According to some embodiments of the invention, an image-based notably a pixel-based porosity simulator can be used, which is much cheaper and less complex than the thermal simulator.

The pixel-based approached proposed in the present invention allows to obtain a more direct prediction of the appearance of porosities by bridging the temperature prediction with the construction of the Correlation Density Spectrum (CDS) by means of the distance matrix.

In some examples, the distance matrix contains the distances, taken pairwise, between the pixels of an image depicting the kinematic path of laser (kinematic file).

Figure 2:
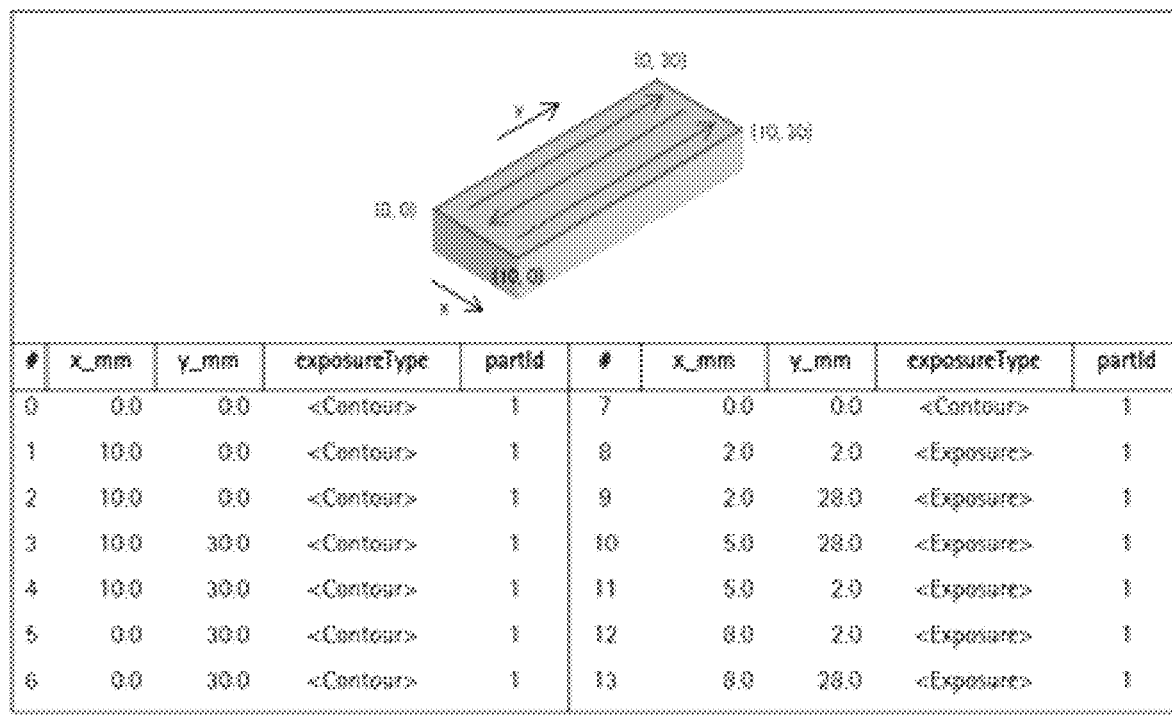
FIG. 2 shows the structure of a kinematic laser file for a single layer of a part slice.
Figure 3:
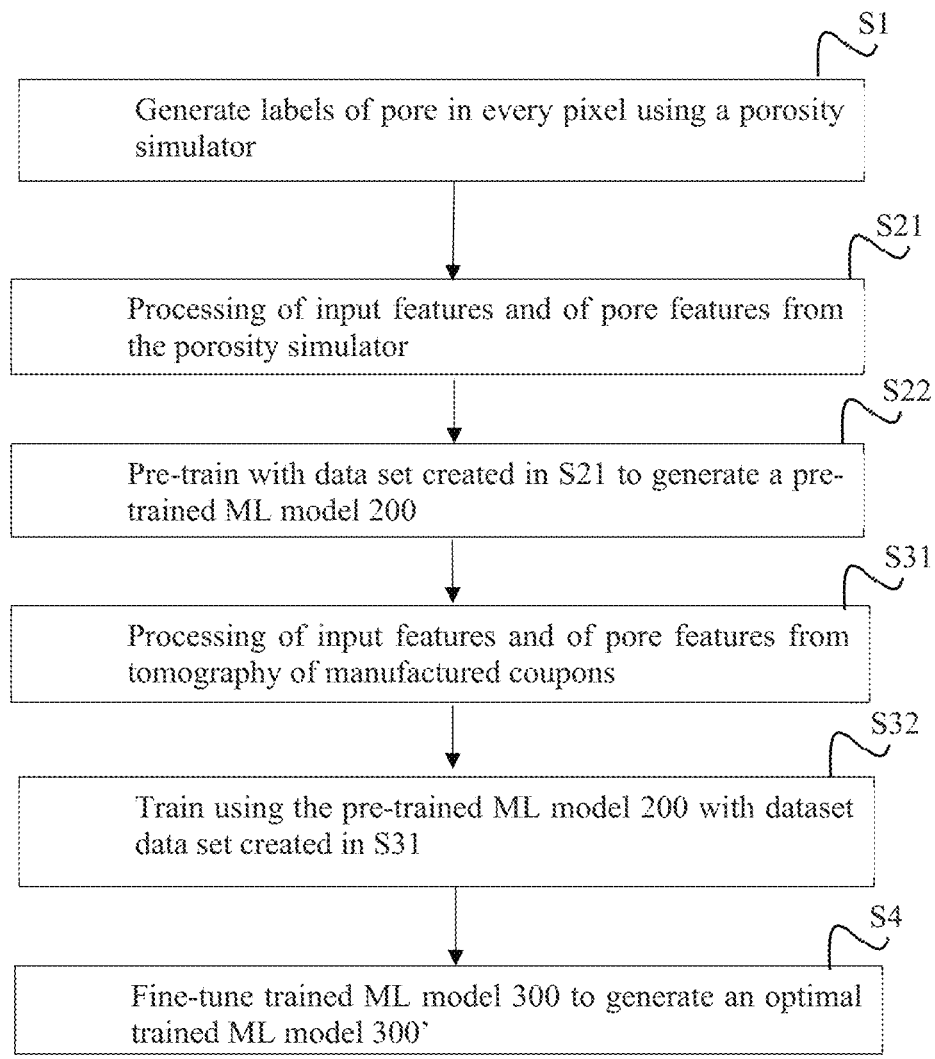
FIG. 3 shows a general flow chart of a method for training neural network according to embodiments of the invention.

FIG. 2 shows the structure of a kinematic laser file for a single layer of a part slice. As shown in FIG. 3, "x_mm" is the x coordinate of a point on the intersecting plane in millimeters, measured from the left edge of the building platform. "y_mm" is the x coordinate of a point on the intersecting plane in millimeters, measured from the front edge of the building platform. "exposureType" indicates whether the point belongs to a part contour or to an exposure line. Points belonging to an exposure line are referred to as inner pixels. "partId" is a unique ID that identifies the part of the work to which the contour or exposure line belongs. "points" is an array of elements of type EOS_EXPOSURE-POINT, consisting of consecutive pairs of points that describes the contour segments or exposure line segments.

The kinematic laser file as shown in FIG. 2 is then read and transformed into a so-called "t-matrix" array which contain an image with a certain pixel size where the value at every pixel (element of array) is the snapshot in time in which the laser passes through in that position represented by the pixel. In some examples, a color scale for example from red to green is used to depict the time value.

Next, the "t-matrix array" is converted into a dataset with the local coordinates and time associated for every pixel. Here, the coordinates of the pixels are given in a local coordinate system while the kinematic laser file is given respect to the global coordinate system of the platform, so a change of the local coordinate system for every manufactured component of the plate is needed, usually by a rotation and displacement to the minimum coordinates (Xmin, Ymin) of each of them plus a certain gap.

In some examples, the pixels may be obtained by reading a kinematic laser file comprising at least an X coordinate and an Y coordinate of each of a plurality of points in a laser path being associated with a time value, the plurality of points being situated on a 2D mesh representing a single layer of the material (2).

In the context of the present invention, the term "pixel" can be understood as a discretization of the space. As mentioned in the examples, the pixels where laser passes though are associated with a time value being the time when the laser passes through. The pixel size is a candidate parameter to be tuned during the training in order to get the best performance in the porosity prediction. The rest of the pixels i.e. those which are not on the laser path are not associated with any time value. More specifically, there might be different scan strategies being applied to the inner pixels (i.e. exposure lines of the laser) and to the contours of the part piece through which the laser pass as well. In some examples, the Correlation Density Spectrum (CDS) is calculated only for the inner pixels, excluding those belonging to the contours of the piece. Still in some examples, there may be two CDSs, one CDS for the cluster of inner pixels belonging to the inner laser paths, and another CDS for the laser paths in the contours of the piece. In some other examples, there may include more CDSs corresponding to every coordinate component such as "X", "Y" and the time, in terms of the differences of coordinates between pair of pixels.

As will be explained below in the preprocessing steps SA, SB and SC, the distance matrix is obtained by calculating the Euclidean distances of every inner pixel with all the pixels through which the laser pass, and then a bucketization of these distances obtained is performed in order to obtain the CDS.

It is described in the article entitled "Dynamic Metamodeling for Predictive Analytics in Advanced Manufacturing" written by Zhuo Yang et al, published in "Smart and Sustainable Manufacturing Systems", Vol. 2, No. 1, 2018, pp. 18-39. On page 21, the distance and variance-covariance matrices is described. Distances between the different positions of laser serve as references of correlation magnitudes, being the Euclidean norm, may determine how much influence is given by one existing data point to others. Another matrix called variance-covariance matrix is derived from the distance matrix and it quantifies the spatial-temporal correlation. This correlation will determine how much influence one existing laser position can influence on others. The Euclidean norm will be modified by the called correlation parameters where every component of the distance vector is pondered by different weights.

In some examples, a Correlation Density Spectrum (CDS) as derived from the distance matrix may be correlated to the pore formation.

In some examples, the data set used for training may be a histogram of distances density as defined for every pixel where:
- if the bins corresponding to small distances are high, means that the heat will concentrate there and therefore a high probability of high temperature may take place with the subsequent pore formation.
- in the contrary, if the bins corresponding with high distance are high, means that the influence of laser is low there, and therefore the temperature raise is not enough for the full fusion of powder metal and the subsequent of pore formation.

The ML model may then learn what histograms will have a greater chance to have porosity and which ones less.

Next, the training process which generates the trained model for porosity prediction and the prediction process which uses the trained model for porosity prediction will be described with reference to FIGS. 3-6. In some embodiments, the pre-trained or trained model may be a machine learning (ML) model.

FIG. 3 shows a general flow chart of the method for training a neural network for predicting porosity appearance performed on the predicting system 5, namely on the training element 6 according to embodiments of the invention.

The training element 6 is configured to train a neural network to generate a trained ML model. In some examples, information such as the process parameters, geometry of the components to be built is collected, then pre-processed to be stored for example in the database 4, next to the porosity of the components. Once a large amount of new data is obtained, the training process starts using the pre-trained model generated based on the porosity simulator 50. This is carried out in a cluster of nodes requiring relatively high computational cost.

Figure 6:
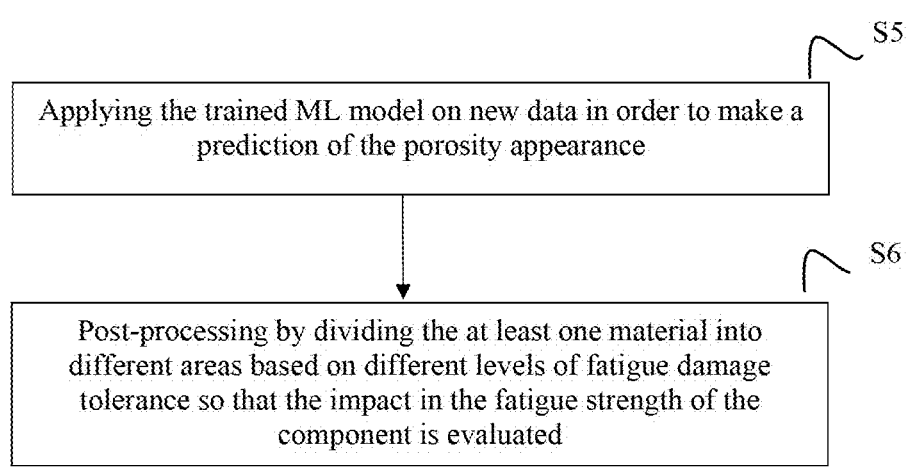
FIG. 6 shows a general flow chart of a method for making predictions with trained ML model according to embodiments of the invention.

The predicting method is described now. In the present invention, predicting method may be a method for predicting porosity appearance during L-PBF process performed by an AM system 1 from at least one material 2. It may include a training phase for training a neural network to produce a trained ML model to be used for predicting porosity appearance (FIG. 3). It may include an execution or predicting phase of the method for predicting porosity appearance in particular those in certain areas sensible to the fatigue damage (FIG. 6). Although mechanical properties are not predicted in a direct way and no fatigue strength parameter is predicted, the evaluated porosity in certain areas sensible to fatigue damage would allow the user to evaluate the impact in the fatigue strength of the component.

As shown in FIG. 3, in step S1, labels of pores (also referred to as "pore labels" throughout the description) are generated for each pixel by running a porosity simulator 50.

In some examples, labels of pores generated are in the form of 1 and 0, representing respectively presence and absence of pore with respect to a pixel. Other forms for indicating the pore labels may be used without limitations.

In order to be used for processing, the labels of pores are converted to porosity probability values (pore label features) for each pixel, and will be explained in more details in steps S2 (pre-training) and S3 (training). It is to be noted that the conversion in S2 is based on pore labels generated from the porosity simulator of step S1 whereas the conversion in S3 is based on pore labels from tomography of real manufactured coupons.

Both pre-training step S2 and training step S3 comprises a first sub-step S21 and S31 respectively and second sub-step S22 and S32 respectively. In the first sub-step (preparation of data set), data set are generated by processing input features and pore label features, and are then used in the second sub-step in either the pre-training step S2 or the training step S3.

The input features such as distance matrix, covariant matrix and CDS etc. is obtained by pre-processing steps SA, SB and SC to be explained below.

In some examples, step SA of kinematic processing comprises generating a distance matrix based on inputted kinematic laser data.

In some examples, the distance matrix is built based on the data set of spatial-temporal coordinates of the pixel where the laser pass through as explained above with reference to FIG. 2. In this case, the metric used is different regarding whether the pixel to obtain the correlation vector belongs to the laser path or not.

In an example, metric to be used for pixels belong to laser path may be:

$$d(\Delta x, \Delta y, \Delta t) = \sqrt{\alpha \cdot \Delta x + \beta \cdot \Delta y + \gamma \cdot \Delta t}$$

It is to be understood that to maintain simplicity, in this example, we will predict the porosity at the section level of the piece. In other words, the 'z' coordinate is ignored and the inter-layer interaction would not be taken into consideration.

The metric evaluation of points belonging to laser path will allow to detect mainly types of pores due to high energy density, gas pores and keyholes.

The examples of the types of pores as explained above are related to hot pores such as gas pores and keyholes. The pore detections may also be applicable to cold pores.

In an alternative example, metric to be used for pixels do not belong to laser path may be:

$$d(\Delta x, \Delta y, \Delta t) = \sqrt{\alpha \cdot \Delta x + \beta \cdot \Delta y}$$

Similarly, the 'z' coordinate is ignored.

The metric evaluation of points not belonging to the laser path will allow to detect pores, mainly, due to lack of fusion, as they usually take place between hatch lines.

The Distance Matrix can be defined as a matrix containing the distance from every pixel 'i' to every pixel 'j' where

- $i = [x, y, t]$
- $j = [x', y', t']$ $$D = \begin{bmatrix} 0 & d(1,2) & \ldots & d(1,n) \\ d(2,1) & 0 & \ldots & d(2,n) \\ \vdots & \vdots & \ddots & \vdots \\ d(n,1) & d(n,2) & \ldots & 0 \end{bmatrix}$$

$\Delta x = x' - x$

-continued $$\Delta y = y' - y$$

$$\Delta t = t' - t$$

In the Distance Matrix, rows represent pixels where the effect of the laser is wanted to know; columns represent pixels where the laser is located, n denotes the number of pixels; and d(i,j) refers to the metric to be used.

Initially the Euclidean metric will be used therefore the Correlation parameter vector, $\theta=[\alpha, \beta, \gamma]$, will be equal to [1,1,1]. Later, the ML algorithm proposed will learn which the best Correlation parameter vector fit for the porosity prediction.

In some examples, the scan pattern used in the manufacturing coupons may be rotated every layer. According to a preferred example, it is rotated by 67 degrees per layer. Furthermore, there is a restriction angle that define the semi-angle of a cone with an axis parallel to Y-component (direction of argon flow) inside of which the hatch lines are forbidden and in these cases the total range angle is 67°+60° (Restriction angle). Therefore, previously to the distance matrix calculation the geometric section of every layer of the manufactured part is rotated in such a way that the hatch lines lie always horizontally.

Step SB comprises calculating a distance correlation of pixels (covariance matrix) based on the distance matrix.

In some examples, the distance correlation of pixels each other is then calculated in the following way in order to build the called "Covariance Matrix":

$$C = \begin{bmatrix} \text{var}(z_1) & \text{var}(z_1, z_2) & \ldots & \text{var}(z_1, z_n) \\ \text{var}(z_2, z_1) & \text{var}(z_2) & \ldots & \text{var}(z_2, z_n) \\ \vdots & \vdots & \ddots & \vdots \\ \text{var}(z_n, z_1) & \text{var}(z_n, z_2) & \ldots & \text{var}(z_n) \end{bmatrix}$$

The correlation determines how much influence is given by one laser point to the other pixels. It will be estimated by the function: $\exp(-\mu \cdot d)$:

$$\text{Var}(\Delta x, \Delta y, \Delta t) = e^{-\mu \cdot d}$$

Where value 1 represents a strongest correlation and value 0 indicates no correlation. The correlation takes values between [0, 1].

The above function allows to tune the damping coefficient in the normalization distance formula, which will in turn allow us to adjust the minimum distance value beyond which, we can the distance values, being included in the same bin.

This way, we can overcome the limitations related with the built of the distance matrix with all the pixels. So we are no longer limited to calculate the distances for pixel inside a square.

Step SC comprises generating Correlation Density Spectrum (CDS) based on the covariance matrix. In some examples, said CDS is generated by discretization (bucketization) based on the covariance matrix, and said CDS comprises data in the form of Distance Density Histograms (DDH).

The number of elements of the covariance-correlation matrix for an image sample size of n×n is $n^2$. That involves considering a huge number of features during the training process and therefore a lot of examples (manufactured specimens) would be required and a deeper Neural Network will be needed to fit the training dataset. In these circumstances the computation time becomes prohibitive, even for modern computer system.

For this reason, "binning" is used to convert continuous features into categorical features in order to reduce the number of unique values that a model will have to deal with. This "binning" process consists of the definition of a serial of ranges (called bins) for the continuous Covariance Vector entrances that correspond to the levels of the new categorical feature that is creating. The values for the new categorical feature are then created by assigning to instances in the dataset, the level of the new feature that corresponds to the range that their value of the continuous feature falls into.

In a preferred embodiment where the values are inside of range [0, 1], the most relevant information is contained mainly in the correlation values near to 1, the bins have been defined to be spaced evenly on an exponential scale such that the largest number of ranges are concentrated nearly to 1, whereas near to zero the bins are wider and there are less number of them. In this example, the values are inside of the range [0, 1]. In a preferred embodiment, number of bins being selected is 50 as a relatively optimum number which may vary according to the embodiments. To obtain the optimum performance of the predictive model, the number of bins can be considered as a candidate parameter to be tuned during the training process.

In this way we finally build the called "Correlation Density Spectrum" (CDS).

The pore label features are obtained by converting the pore labels (0 or 1 for absence or presence of pore) generated in step S1 to porosity probability values for each pixel. The porosity probability values are hereunder referred to as pore label features.

Figure 4:
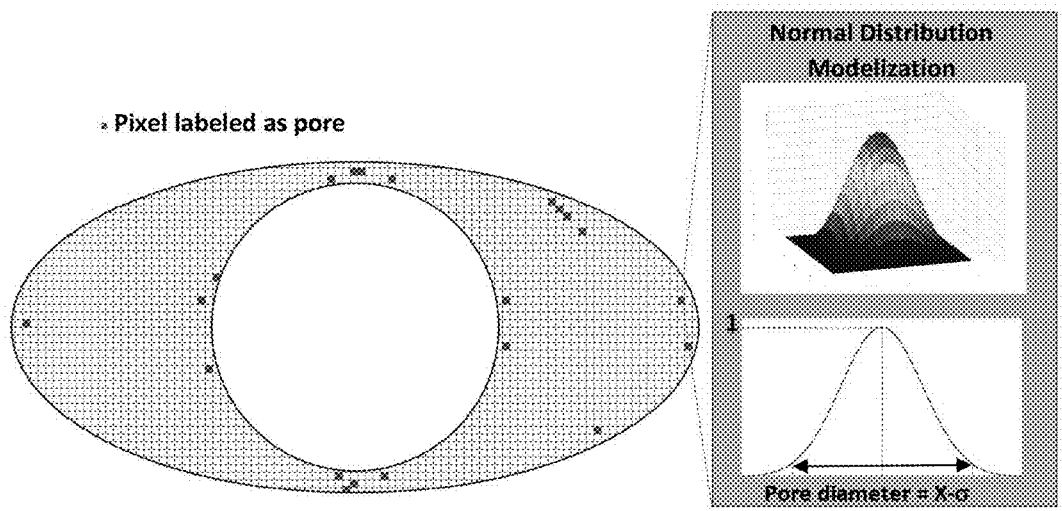
FIG. 4 shows porosity probability values for each pixel is obtained from labels of pores by performing Normal distribution with respect to pore diameter.

In some examples, the conversion comprises performing the spatial probability distribution of pore appearance following a sort of Normal distribution where the mean of distribution is in the location where has been positioned the pore with a maximum value equal to 1 and a standard deviation equal to "X" times the diameter of the pore, as shown in FIG. 4.

For the step S2, since pore diameter is not provided by the porosity simulator, so we will take the pixel size as reference magnitude to define the standard deviation of the distribution It is to be noted that the Normal distribution used to express the spatial probability distribution of pore appearance is only one specific example within the context of the present invention, and the present invention is not limited thereto, other probability distribution function may also be used where it is appropriate.

After this conversion, the porosity probability values for each pixel is deducted from pore labels for each pixel and ready to be used for processing in sub-step S21.

As mentioned above, the first sub-step S21 comprise processing of input features and pore labels features.

Figure 5A:
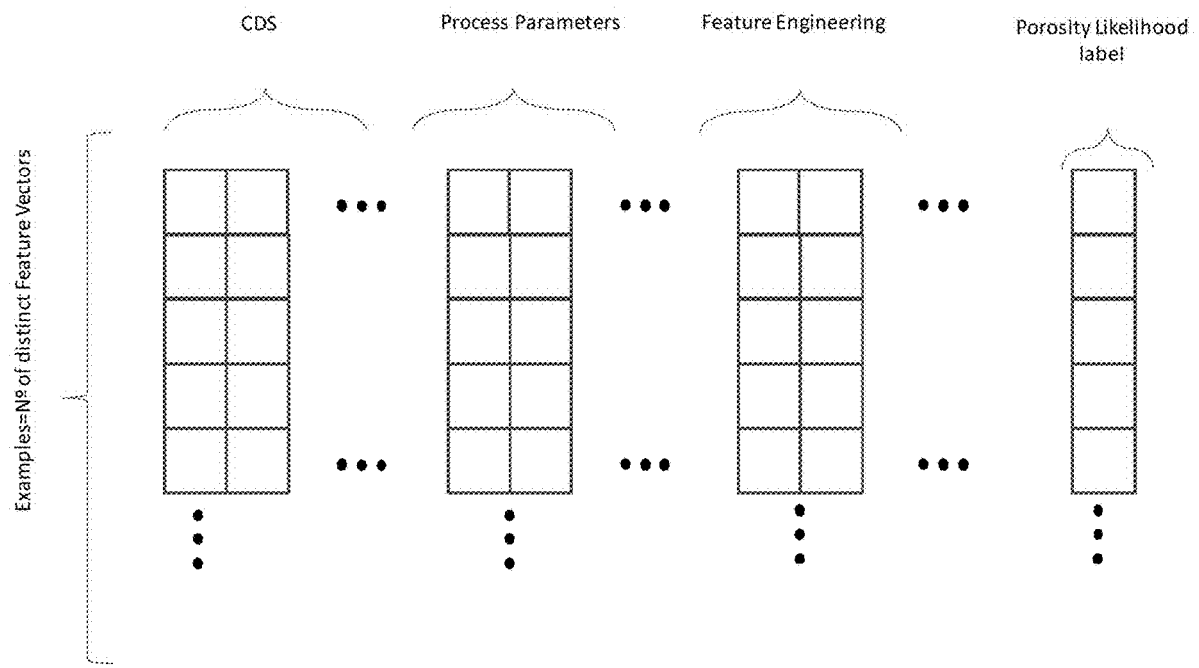
FIG. 5A illustrate an example of the training dataset array according to embodiments of the invention.

The input features and pore labels features may constitute the feature vectors to be processed in the first sub-step of the pre-training S2 or the first sub-step of the training S3. Advantageously, the feature vectors may be a data matrix comprising columns and rows. In a preferred embodiment, the columns comprising variables such as input features being process parameters information feature, CDS feature and hatch line sequence feature, as well as the pore label features in every pixel. The pore label features are filled with the associated porosity likelihood of every location. Every row of and each row excepting the pore label features is referred to as "feature vectors". An example of the training dataset array is shown in FIG. 5A.

The processing of S21 will now be described in details with reference to FIG. 5 according to some examples of the present invention.

Figure 5B:
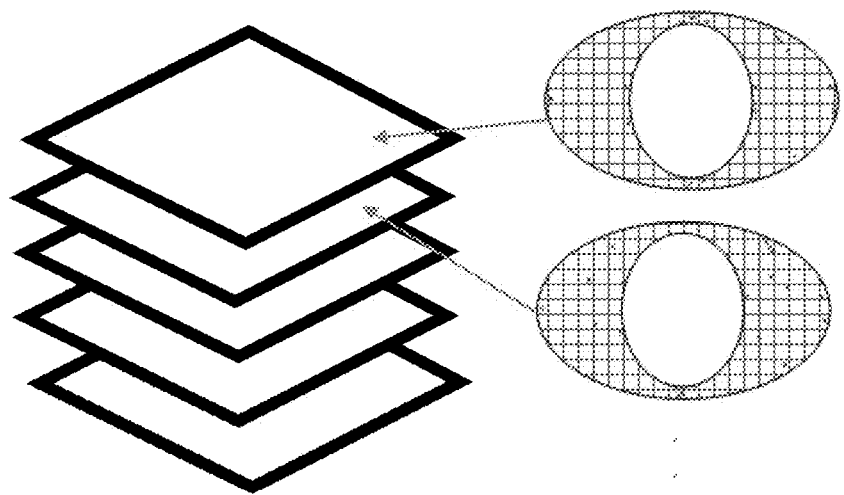
FIG. 5B illustrate how to obtain the porosity likelihood label for the data set according to embodiments of the invention.

According to some embodiments of the porosity simulator, every pixel is labeled as pore or not pore (1 or 0). During the pretraining S2, as shown in FIG. 5B, the accumulative frequent for every set of pixels with the same feature vector are calculated by adding up their labels and divided by the size of sample of the cluster. This is done for every cluster with different feature vector, and in this way, we obtain the porosity likelihood label for every row of the training dataset. As shown in FIG. 5B, in a preferred embodiment, all the layers are evaluated rather than making a selection of a reduced group of representative layers for the feature vector extraction.

In order to obtain the porosity likelihood label for every row of the training dataset, pixels with the same feature vector are grouped.

After the processing in the first sub-step S21, a pre-training data set is created to be used for the pre-training in the second sub-step S22. The data set is with respect to a set of feature vectors which are associated with or linked to porosity likelihood label.

In step S22, the data set created from the first sub-step S21 is used to generate a pre-trained ML model.

In step S3, training comprises a first sub-step S31 as mentioned above and a second sub-step S32. S3 uses the data set created from the first sub-step S31 to train the pre-trained ML model 200.

Steps in S3 which are similar to those in S2 will not be repeated here. Those steps may comprise the pre-processing steps SA, SB, SC and the conversion to obtain the porosity probability values for each pixel to process in sub-steps S31.

It is to be noted that for step S3, the pore labels is from the tomography of real manufactured coupons. So the pore diameter used following the Normal distribution will be provided with the coupons. The conversion is performed to obtain porosity probability values for each pixel to be then processed in sub-step S31.

In some examples, the second sub-step S32 comprises training of pre-trained model with data set created from S31. As mentioned in S31, this data set may be a relatively small dataset with real manufactured coupons.

Following the pre-training step where initially a conventional fully dense neural network is chosen as baseline, the training step involves gradually increasing the complexity of model for achieving better prediction results, always compared with the baseline ones.

It is proposed by the present invention that tuning the pre-trained ML model 200 in order to fit the dataset coming from a relatively small set of manufacturing coupons is realized by "Transfer Learning". It allows to customize the pre-trained ML model 200 for different 3D machines and materials, saving computational time and manufacturing cost.

Generally speaking, transfer learning according to embodiments of the present invention may comprise reusing the pre-trained ML model 200 as starting point for a model on the customization task of interest. This may involve using all or different parts of the pretrained ML model 200. Then, the model parameters may need to be adjusted on the new input-output data available.

In some examples, the transfer learning comprises first recopying (dumping) the pre-trained model to the trained model, then adding at least one layer to the neural network having been pre-trained in pre-training step (S2), and adjusting the weights related to the added at least one layer based on a porosity result of the manufactured coupons to build the trained model.

Preferably, the training may further comprise a step of fine-tuning S5 where the steps of metric learning algorithm may be iteratively repeated with the training and validation dataset, up to achieve a model that generalizes the validation dataset without overfitting and underfitting.

In some further examples, in the fine-tuning step S5, the model is evaluated with another independent testing set to get the optimal model.

Advantageously, the fine-tuning step S5 further improves the accuracy of the prediction by using metric learning algorithm.

This algorithm allows to find the real similarity between different points of powder material that interact with the energy laser injection. This allows to achieve better performance on the quality of the metric, identifying as similar the pair of points that are indeed close, from the powder bed fusion process point of view.

The advantages in view of applying a pre-training step and a training step with the pretraining being prior to the training will be explained here.

Conventionally, in order to train a ML model, a high number of manufacturing coupons would be required and depending on the material being used, the fabrications may be quite expensive.

The reduction of manufacturing coupons and the optimization of the information susceptible to be collected, is thus desired.

Another advantage for treating the porosity at a pixel level with a small size, is that it allows to obtain a high number of examples for the training dataset without the need of many specimens in both cases of simulated and manufactured ones with the save of time and cost that it involves.

Advantageously, in order to overcome this obstacle regarding high number of examples, the present invention proposes to perform a pre-training of ML model, using the data set prepared using the pixel-based porosity simulator based on a series of semi-empirical laws that govern such phenomenon. These laws represented by equations of certain sensitive parameters of the process may not be sufficiently accurate, but it would be sufficient to capture the general behavior or tendency of the pore formation that together with the inclusion of a certain stochastic randomness in the appearance of the pore by means of a known normal distribution, In one aspect, the porosity simulator is governed by the results obtained from the development of a "thermal model" that simulates the thermal evolution during the manufacturing process in the component in question, which is used to replace the temperature-based simulation by the present invention.

This "thermal model" has the advantage that the time computational is acceptable for generating a large amount of data needed for a preliminary training or pre-training of the ML models and the accuracy on the thermal map prediction is just sufficient for the exact purpose.

It is thus particularly advantageous to deploy the pre-training to achieve a first approximation of the solution of the porosity appearance in a simplified manner prior to training the pre-trained model this time with manufactured coupons. The cost for training the ML model directly with the prepared data set would have be much higher than with the pre-training as proposed here.

In another aspect, there are factors which have a relevant role in the pore formation but which are not taken into account in the equations used for constructing the porosity simulator. These factors either implies relatively high computational cost, or are of uncertainties as their influence to the porosity formation.

It is therefore advantageous to make the prediction based on the probability of the porosity appearance rather than on the porosity appearance itself (for example, the numbers of pores) because in this way, uncertainties may be reflected in an apparent stochastic noise in the porosity solution projected in a lower dimensional space (for example in the ML model). In other words, the ML model will be trained to learn the "shape" of a binomial probability density distribution", where the variability of the appearance of pore due to the apparent stochastic influence of the rest known and unknown parameters, are intrinsically taken into account with the prediction of such probability density distribution.

Therefore, the present invention a predicting method not defined in deterministic terms but in statistic terms, that is, given a desired material density (porosity) that occurs with a certain confidence level.

FIG. 6 shows a general flow chart of the method for making predictions based on the trained ML model 300 performed on the predicting system 5 according to embodiments of the invention.

In step S5, the trained ML model 300 is applied on new data continuously provided by said AM system (1) in order to make a prediction of the porosity appearance.

In some examples, the trained ML model may be the result of the training step S3. In some other examples, the trained ML model may be the result of the fine-tuning step S4. The number of bins, pixel size, and damping coefficient can be relevant hyperparameter to be tuned in order to achieve the optimization of the trained ML model.

In step S6, post-processing will allow a user to evaluate the impact in the fatigue strength of the component.

In fact, the post-processing may be considered as an indirect way of fatigue properties prediction, since information will be provided about porosity near of surfaces, stress concentration areas and close pores, which has a direct impact in the fatigue properties. However, these impact in the fatigue properties is not quantified and the fatigue property values is not predicted.

In some examples, the post-processing step S5 further comprises dividing the at least one material (2) into different areas based on different levels of fatigue damage tolerance.

In some examples, the different areas may comprise: an area close to surfaces of the material 2, an area with stress concentrations, an area with pores being close to each other, and an area substantially absent of pores.

Figure 7:
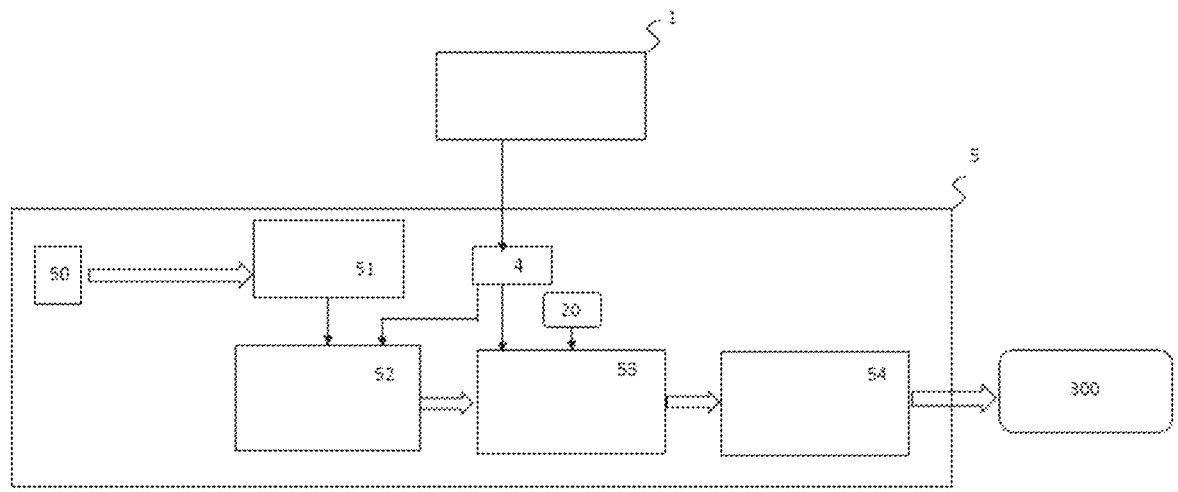
FIG. 7 shows the implementations of relevant modules in the training phase according to embodiments of the invention.

FIG. 7 shows the implementations of relevant modules in the training phase according to embodiments of the invention. In some examples, the prediction system 5 may comprise a training element 6.

The printing system 1 is shown connected with the prediction system 5 in FIG. 7. This is not designed to exclude the situations where the prediction system 5 namely the training element 6 is not interactive with the printing system 1 and is uncoupled from the latter, for example, during a development stage of the training phase.

In some examples, it is not necessary to train a ML model every time when a component is built or input data is collected from machine in real time. We could collect information of a battery of fabrications during a relative long time elapse, then one can decide whether if the information is sufficient. If it is determined that the information is sufficient, then it begins to analyze the gathered information, to prepare/preprocess and finally to train the model.

The training phase is different from the prediction phase in that the training element, being based on a supervised algorithm, requires an additional feature to be trained, namely the porosity. This porosity is not obtained from the printing system 1. It is either provided from the porosity simulator in case of the pre-training step, or provided from the tomographies of the manufactured coupons.

With reference to FIG. 7, the training process may in general be carried out as follows: pre-training with porosity simulator, where the input data to the model, process parameters geometry etc. is defined and a porosity map is outputted. This porosity map could be more or less accurate, which does not matter in view of the whole process, as next training is carried out with real manufacturing coupons. At the end, a fine-tuning of the hyperparameters of the model may be implemented, in order to optimize the prediction result.

In some examples, the trained ML model obtained following the above-explained process may be encapsulated or packaged, and then incorporated to the architecture of the prediction element 7 and integrated with the other systems or apparatus of FIG. 1.

In some examples, the training process may be carried out more manually or more or less automatized with an independent architecture. The present application should not be limited by the level of automation in terms of the prediction.

In some examples, the predicting system 5 may comprise: a generating module 51, being configured to generate labels of pore in every pixel using a porosity simulator 50; a pre-training 52 module, comprising a first sub-module 521 and a second sub-module 522 (521 and 522 are not shown in FIG. 7). In some examples, the second sub-module 522 is configured to use the data set created from the first sub-module 521 to generate a pre-trained model 200 (not shown in FIG. 7). The predicting system 5 may further comprise a training module 53, comprising a first sub-module 531 and a second sub-module 532 (531 and 532 are not shown in FIG. 7). In some examples, the second sub-module 532 is configured to use the data set created from the first sub-module 531 to train the pre-trained model 200 to generate a trained ML model 300.

In some examples, the first sub-module is further configured to process input features and to process pore label features in every pixel to create the data set to be used by the second sub-module.

In some examples, the pore label features being processed in the first sub-module 521 of the pre-training module 52 is based on the output of the porosity simulator. In some examples, the pore label features being processed in the first sub-module 531 of the training module 53 is based on tomography of manufactured coupons 20.

Optionally, in some examples, the predicting system 5 may further comprise a fine-tuning module 54, being configured to generate an optimized trained ML model 300' based on the trained model 300 received from the training module 53.

It is to be noted that the expression "trained ML model" can be used not only to denote the trained ML model 300, but also to denote in a general manner the optimized trained ML model 300'. In other words, although the output of the predicting system 5 in the training phase may be respectively a trained ML model 300 or an optimized trained model 300' depending on the absence or presence of the fine-tuning module 54 in the predicting system 5, it is referred to as "(trained ML model) 300" without making difference between 300 and 300' as shown in FIG. 7.

Although not shown in FIG. 6, the predicting system 5 may further comprise a memory 57, which is configured to store for example the results of the trained ML module.

At the end of the training phase, the predicting system 5 can output a trained ML model. As mentioned above, this trained ML model may be outputted from the training module 53 or from the fine-tuning module 54.

Figure 8:
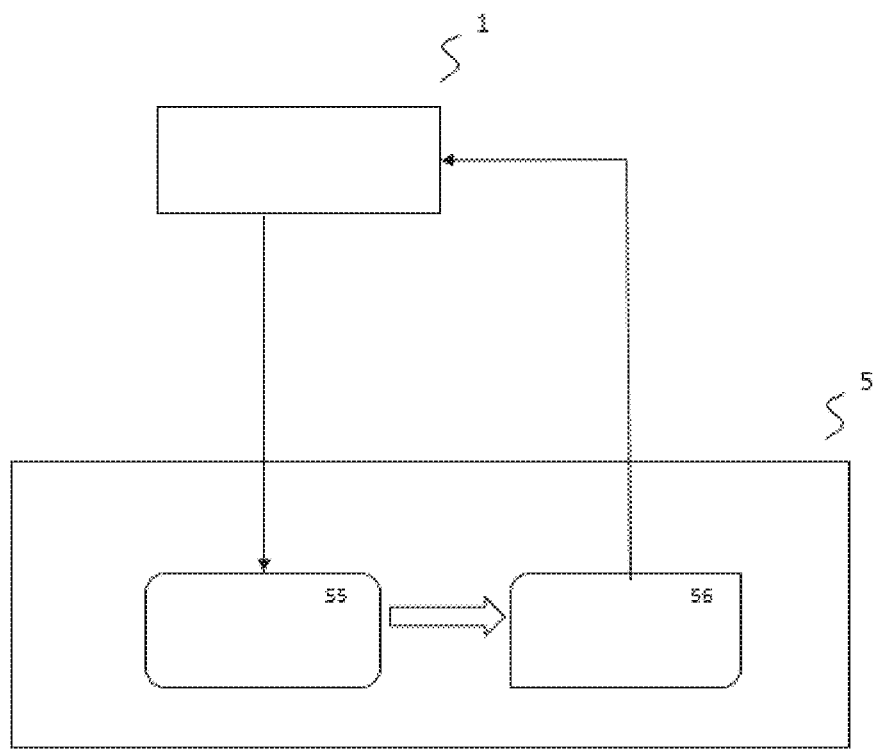
FIG. 8 shows the implementations of relevant modules in the predicting phase according to embodiments of the invention.

FIG. 8 shows the implementations of relevant modules in the predicting phase according to embodiments of the invention. In some examples, the predicting system 5 may comprise a predicting element 7.

As shown in FIG. 8, data is received by the predicting element 7. In some examples, the data may be static data, so the prediction may be done previously. In other examples, the data may be dynamic data, so the prediction may be done during the manufacturing process.

The predicting system 5 may further comprise a module (55) for applying the trained ML model and a module (56) for post-processing to allow a user to evaluate the impact in the fatigue strength of the component and to generate a quality report with respect to the user's requirements.

The invention has been described with reference to preferred embodiments. However, many variations are possible within the scope of the invention.

The invention claimed is:

1. A method for automatic prediction of porosity appearance generated during Laser Powder Bed Fusion (L-PBF), performed by an additive manufacturing (AM) system (1) from at least one material (2), the method comprises steps for training a neural network comprising:
    reading a kinematic laser file describing laser exposure over a layer of a part slice, the kinematic laser file comprising at least an X coordinate, an Y coordinate of each of a plurality of points in a laser path, the plurality of points being situated on a 2D mesh representing the layer, a point of said plurality of points being associated with an exposure time representing a time which a laser passes through the point and an exposure type indicating whether a point of said plurality of points belongs to a part contour or to an inner laser path, and
    converting the kinematic laser file into a dataset comprising an array of pixels discretizing the layer, a pixel of said array being associated with local coordinates and with an exposure time representing a time at which a laser passes through the local coordinates of the pixel;
    generating (S1) labels of pores, representing presence or absence of pores, in each pixel of the dataset using a porosity simulator (50) wherein the porosity simulator is image-based and the generated label of pores for a pixel of the dataset is in the form of 1 or 0, representing respectively presence or absence of pores with respect to the pixel;
    pre-training (S2) a machine learning (ML) model, wherein the pre-training comprises:
        a first pre-training sub-step (S21) comprising creating a first data-set, by for each pixel of the dataset, processing input features and pore label features based on the labels of pores generated by the porosity simulator, said input features and processing pore label features constituting feature vectors associated with said pixel; and
        a second pre-training sub-step (S22) comprising using the feature vectors of the first data-set to generate a pre-training ML model (200);
    training (S3) a ML model, wherein the training comprises:
        a first training sub-step (S31) comprising creating a second data-set by, for each pixel of the dataset, processing input features and pore label features based on tomography of manufactured coupons (20), said input features and pore label features constituting feature vectors associated with said pixel; and
        a second training sub-step (S32) comprising using the feature vectors of the second dataset to train the pre-trained ML model (200) to generate a trained ML model (300);
    generating a predicted porosity appearance during Laser Powder Bed Fusion (L-PBF), performed by the AM system (1) from at least one material (2), by applying (S5) the trained ML model on new data continuously provided by the AM system (1); and
    post-processing the predicted porosity appearance so as to generate a quality report,
    wherein the input features being processed in the first pre-training sub-step (S21) and first training sub-step (S31) comprise Correlation Density Spectrum (CDS), and the input features are obtained by preprocessing steps (SA, SB, SC) comprising:
        kinematic processing (SA) to generate a distance matrix based on kinematic laser data, by calculating a Euclidean distance of each pixel of the dataset, belonging to an inner laser path, referred to as inner pixel, with all the pixels of the dataset through which the laser passes;
        calculating (SB) a distance correlation of pixels comprising covariance matrix based on the distance matrix; and
        generating (SC) CDS based on the covariance matrix.

2. The method according to claim 1, wherein the method further comprises a fine-tuning step (S4) following the training step (S3), the fine-tuning step comprising generating an optimized trained ML model by repeating iteratively the training step (S3) with the training data set and a validation data set, where the validation data set generated by the optimized trained ML model meets conditions for absence of overfitting and underfitting.

3. The method according to claim 1, wherein the predicting porosity appearance step further comprises an intermediate post-processing step (S6) following the applying step (S5), the intermediate post-processing step (S6) comprising dividing the at least one material (2) into different areas based on different levels of fatigue damage tolerance so that an impact in a fatigue strength of a component created by the AM system is evaluated.

4. The method according to claim 1, wherein said CDS is calculated for all the pixels of a 2D mesh representing a single layer of the at least one material (2) excluding contours of the 2D mesh generated by discretization based on the covariance matrix, and said CDS comprises data in a from of Distance Density Histograms (DDH).

5. The method according to claim 1, wherein the pore label features based on the labels of pores, the pore label features based on tomography, or both, comprise porosity probability values of each pixel, being converted from labels of pore of presence or absence of each pixel (1 or 0) by following a Normal distribution.

6. The method according to claim 1, wherein the first data set, the second data set, or both, are with respect to a set of feature vectors linked to a porosity likelihood label.

7. The method according to claim 1, wherein the training step (S3) comprises applying transfer learning, which comprises reusing the pre-trained ML model, adding at least one layer to the pre-trained ML model, and adjusting weights related to the added at least one layer to train the manufactured coupons.

8. A predicting system (5) for automatic prediction of porosity appearance generated during Laser Powder Bed Fusion (L-PBF), performed by an additive manufacturing (AM) system (1) from at least one material (2), comprising modules being configured for training a neural network:
- at least one module configured to read a kinematic laser file describing laser exposure over a layer of a part slice, the kinematic laser file comprising at least an X coordinate and an Y coordinate of each of a plurality of points in a laser path, the plurality of points being situated on a 2D mesh representing the layer, a point of said plurality of points being associated with an exposure time representing a time at which a laser passes through the point and an exposure type indicating whether a point of said plurality of points belongs to a part contour or to an inner laser path, and to convert the kinematic laser file into a dataset comprising an array of pixels discretizing the layer, a pixel of said array being associated with local coordinates and with an exposure time representing a time at which the laser passes through in the local coordinates of the pixel;
- a generating module (51) configured to generate labels of pore representing presence or absence of pores in each pixel of the dataset using a porosity simulator (50), wherein the porosity simulator is image-based and the generated label of pores for a pixel of the dataset is in the form of 1 or 0, representing respectively presence or absence of pores with respect to the pixel;
- a pre-training module (52) comprising:
  - a first pre-training sub-module (521) configured to create a first data-set by, for each pixel, processing input features processing pore label features based on the labels of pores generated by the porosity simulator, said input features and pore label features constituting feature vectors of the second dataset associated with said pixel; and
  - a second pre-training sub-module (522) configured to use the feature vectors of the first data set to generate a pre-trained model (200); and
- a training module (53) comprising:
  - a first training sub-module (531) configured to create a second data-set by, for each pixel, processing input features and pore label features based on tomography of manufactured coupons (20) said input features and pore label features constituting feature vectors of the second dataset associated with said pixel; and
  - a second training sub-module (532) configured to use the feature vectors of the second data set to train the pre-trained model (200) to generate a trained model (300);
- one or more preprocessing modules configured to obtain input features comprising Correlated Density Spectrum (CDS), the input features obtained by:
  - generating a distance matrix based on kinematic laser data via kinematic processing (SA), by calculating Euclidean distances of each pixel of the dataset belonging to an inner laser path, referred to as inner pixel with all the pixels of the dataset through which a laser passes;
  - calculating (SB) a distance correlation of pixels comprising covariance matrix based on the distance matrix;
  - generating (SC) CDS based on the covariance matrix;
- one or more additional modules configured to:
  - predict porosity appearance generated during Laser Powder Bed Fusion (L-PBF), performed by an additive manufacturing system (1) from at least one material (2), the predicting module configured to apply (S5) the trained model on new data continuously provided by the AM system (1) in order to generate a predicted porosity appearance; and
  - post-process the predicted porosity appearance so as to generate a quality report.

9. The system according to claim 8, further comprising a fine-tuning module (54) configured to generate an optimized trained model based on the trained model (300) received from the training module (53).

10. The system according to claim 8, further comprising one or more modules for making a prediction, the one or more modules being configured to:
- apply (55) the trained model on new data continuously provided by the AM system (1) in order to make a prediction of the porosity appearance, and
- post-process (56) the prediction of the porosity appearance, comprising dividing the at least one material (2) into different areas based on different levels of fatigue damage tolerance so that an impact in a fatigue strength of a component manufactured by the AM system is evaluated.

* * * * *